(12) United States Patent
Svechkopalov et al.

(10) Patent No.: US 8,895,642 B2
(45) Date of Patent: Nov. 25, 2014

(54) BUOYANCY CONTROL MATERIAL FOR SUBSEA MAIN PIPELINES AND HIGH-DENSITY BUOYANCY CONTROL MATERIAL FOR SUBSEA MAIN PIPELINES

(76) Inventors: Anatoly P. Svechkopalov, Moscow (RU); Igor I. Shaporin, Moscow (RU)

( * ) Notice: Subject to any disclaimer, the term of this patent is extended or adjusted under 35 U.S.C. 154(b) by 0 days.

(21) Appl. No.: 13/817,139

(22) PCT Filed: Mar. 24, 2011

(86) PCT No.: PCT/RU2011/000180
§ 371 (c)(1),
(2), (4) Date: Jul. 25, 2013

(87) PCT Pub. No.: WO2012/078071
PCT Pub. Date: Jun. 14, 2012

(65) Prior Publication Data
US 2014/0018476 A1    Jan. 16, 2014

(30) Foreign Application Priority Data

Dec. 8, 2010  (RU) .................................. 2010150259
Jan. 18, 2011 (RU) .................................. 2011101633

(51) Int. Cl.
| | | |
|---|---|---|
| F16L 1/24 | (2006.01) | |
| F16L 9/14 | (2006.01) | |
| F16L 58/06 | (2006.01) | |
| C04B 28/04 | (2006.01) | |
| C04B 14/36 | (2006.01) | |
| C04B 20/00 | (2006.01) | |
| C04B 24/22 | (2006.01) | |
| C04B 24/26 | (2006.01) | |
| C04B 111/00 | (2006.01) | |
| C04B 111/56 | (2006.01) | |
| C04B 111/20 | (2006.01) | |
| C04B 111/74 | (2006.01) | |

(52) U.S. Cl.
CPC ............... *F16L 1/24* (2013.01); *C04B 20/0076* (2013.01); *C04B 24/223* (2013.01); *C04B 24/2641* (2013.01); *C04B 14/368* (2013.01); *C04B 28/04* (2013.01); *C04B 2111/0031* (2013.01); *C04B 2111/00482* (2013.01); *C04B 2111/56* (2013.01); *F16L 9/14* (2013.01); *F16L 58/06* (2013.01); *C04B 2111/2015* (2013.01); *C04B 2111/74* (2013.01); *C04B 2201/20* (2013.01); *C04B 2201/50* (2013.01)
USPC .......................................................... 524/5

(58) Field of Classification Search
CPC ............... F16L 1/24; F16L 9/14; F16L 58/06; C04B 28/04; C04B 14/36; C04B 14/368; C04B 20/0076; C04B 24/223; C04B 24/2641; C04B 2111/0031; C04B 2111/00482; C04B 2111/56; C04B 2111/2015; C04B 2111/74; C04B 2201/20; C04B 2201/50
USPC .......................................................... 524/5
See application file for complete search history.

(56) References Cited

FOREIGN PATENT DOCUMENTS

| RU | 2257503 C1 | * | 7/2005 | |
| SU | 1316995 A1 | * | 6/1987 | |
| SU | 1717580 A1 | * | 3/1992 | |
| WO | WO 9801402 A1 | * | 1/1998 | ............... C04B 14/36 |
| WO | WO 0020183 A1 | * | 4/2000 | |

OTHER PUBLICATIONS

English abstract for RU 2257503 C1, Jul. 2005.*

* cited by examiner

*Primary Examiner* — Angela C Scott
(74) *Attorney, Agent, or Firm* — Inventa Capital PLC

(57) ABSTRACT

The buoyancy control material for subsea main pipelines and high-density buoyancy control material for subsea main pipelines are suggested predominantly for use while manufacturing pipes for subsea pipeline installations. Creation of a buoyancy control material with a density greater than 2800 kg/m³ and the required mobility is an engineering problem solved by this invention. The buoyancy control material for subsea main pipelines contains cement, filler, plasticizing agent and water.

2 Claims, 2 Drawing Sheets

BUOYANCY CONTROL MATERIAL FOR SUBSEA MAIN PIPELINES AND HIGH-DENSITY BUOYANCY CONTROL MATERIAL FOR SUBSEA MAIN PIPELINES

RELATED APPLICATIONS

This application claims priority to Patent Cooperation Treaty Application number PCT/RU2011/000180, filed on Mar. 24, 2011, which claims priority to Russian patent application numbers RU2010150259, filed on Dec. 8, 2010 and RU2011101633, filed on Jan. 18, 2011 and incorporated herewith by reference in its entirety.

FIELD OF THE INVENTION

This invention is pertinent to pipeline equipment, specifically to buoyancy control materials applying on the outside pipe surface of subsea main pipelines to weight them down.

BACKGROUND OF THE INVENTION

The buoyancy control system for tubes including a buoyancy control material of a density equal to or greater than 2000 kg/m³ that comprises components as follows: cementing component, additive regulating the solidification time, fillers—water-sand mixture and/or water-barite mixture (U.S. Pat. No. 6,663,453, F16L 1/16, 9 Jan. 2003), is known. The description of this patent does not disclose a component content of the buoyancy control material and a grain-size composition of fillers. The fact that acceptable density of buoyancy control material of present-day main pipelines is considerably higher than 2000 kg/m³ is a disadvantage of the known system.

Extra heavy concretes, among them barite concrete, a density of which exceeds 2500 kg/m³ (http://betony.ru), are known, but a composition of extra heavy concrete and details of its application as a buoyancy control material for tubes are not described in the abovementioned source.

The concrete comprising barite as a filler is referred to (WO 98/01402, C04B 14/36, 15 Jan. 1998). To increase density, the filler has the predetermined grain-size composition, in which 8% wt (percents by weight) of barite are in the form of extra fine fraction having a particle size from 0.01 μm to 1000 μm, 4% wt in the form of fine fraction having a particle size from 1 mm to 3 mm, 10% wt in the form of coarse fraction having a particle size from 3 mm to 7 mm; fine silica sand having a grain size from 0.1 mm to 3 mm; coarse fraction of gravel from 3 mm to 75 mm. A water-cement ratio by mass is specified within the range from 0.30 to 0.35. Such composition has two major disadvantages: first—impossibility to obtain buoyancy control material with the guaranteed density exceeding 2800 kg/m³ due to lack of limitations by materials and their density for coarse and fine fillers; second—a small water-cement mass ratio in solution (from 0.30 to 0.35), that does not allow to use sluggish solution having coarse fractions to fill up the annulus between the conductive pipe and shell by injection through openings in lids.

The buoyancy control material for subsea main pipelines, that is the nearest analog of the claimed invention and contains cement, filler, plasticizing agent and water (RU 2257503, F16L 1/24, 27 Jul. 2005), is known. This material is employed to form a layer of a buoyancy control material on a conductive pipe by filling in the annulus between the conductive pipe and shell of main pipelines and is the cement-sand solution with a mobility being sufficient to fill in the annulus between the conductive pipe and shell. The major drawback of the known material is its low density (up to 2400 kg/m³) generating a need to increase sizes of the buoyancy control material annulus to make a pipeline negatively buoyant.

SUMMARY OF THE INVENTION

The engineering problem solved by this invention is development of the buoyancy control material with a density greater than 2800 kg/m³ that has a compression strength reaching 50 MPa after hardening and ageing treatment within 28 days, that allows a significant reduction of the outside diameter of pipes with the ballasting coating.

This technical result is achieved by the reason that the buoyancy control material for subsea main pipelines comprises cement, filler, plasticizing agent and water. Sulfate-resisting portland cement is employed as a cement. Polycarboxylate-ester-based plasticizing agent is applied as a plasticizing agent. Barite middling product, barite ore and ferro-manganese concentrate are used as a filler of the material. The claimed material has a mixture ratio as follows, % wt: portland cement from 8.2 to 10.5, water from 5.2 to 6.7, plasticizing agent from 0.1 to 0.15, barite middling product from 15 to 20 having a density from 3.78 to 3.82 kg/cm³, barite ore from 15 to 20 having a density from 3.9 to 4.1 kg/cm³, ferro-manganese concentrate from 50 to 60 having a density from 4.2 to 4.5 kg/cm³. A water-portland cement ratio is within the range from 0.35 to 0.5. A grain-size composition of filler components in the claimed material is as follows: under 0.16 mm—up to 5%, from 0.16 to 1.0 mm—up to 25%, from 1.0 to 2.5 mm—up to 35%, from 2.5 to 5.0 mm—the rest.

A mixture ratio of the claimed material became available in the course of numerous natural experiments. Some results of them are given in Table 1. Addition of barite middling product to barite ore permits a considerable reduction of the buoyancy control material cost. A water-cement ratio selected within the range from 0.35 to 0.5 is needed to achieve the required mobility of the buoyancy control material.

A grain-size composition of the claimed material is given in Table 2. Selection of ratios is dictated by the necessity to achieve a buoyancy control material having the specified density. The density and compression strength of the suggested buoyancy control material can be found in the same table.

The claimed buoyancy control material enables to get the required density of extra heavy buoyancy control materials with a high accuracy within the range from 3350 to 3450 kg/m³.

The technical result is achieved as well by that the high-density buoyancy control material for subsea main pipelines contains cement, filler, plasticizing agent and water. In this case sulfate-resisting portland cement is employed as a cement. Barite ore and ferro-manganese concentrate are applied as a filler in the material. The claimed material has a mixture ratio as follows, % wt: portland cement from 9.2 to 10.5, water from 4.0 to 5.5, plasticizing agent from 0.05 to 0.18, barite ore from 3 to 17 having a density from 3.9 to 4.1 kg/cm³, ferro-manganese concentrate from 69 to 82 having a density from 4.2 to 4.5 kg/cm³. A water-portland cement ratio is within the range from 0.35 to 0.5. A grain-size composition of filler components makes up:
  under 0.16 mm—up to 3%,
  from 0.16 to 1.0 mm—up to 27%,
  from 1.0 to 2.5 mm—up to 34%,
  from 2.5 to 5.0 mm—the rest.

A complex additive consisting of all types of plasticizing agents with the following ratios, vol. % (percent by volume):
plasticizing agent based on polycarboxylates and polyacrylic resins from 72 to 82;
plasticizing agent based on sulfonated naphthalene-formaldehyde polycondensates from 4 to 10;
plasticizing agent based on sulfonated melamine—formaldehyde polycondensates from 6 to 10;
plasticizing agent based on refined lignosulphates from 3 to 8;
is employed as a plasticizing agent in the claimed material.

A mixture ratio of the claimed material was determined in the course of numerous natural experiments, some their results are given in Table 3.

A grain-size composition of the claimed material is presented in Table 4. Selection of ratios is dictated by the necessity to achieve a buoyancy control material having the specified high density. A density and compression strength of the suggested high density buoyancy control material is given in the same table.

The suggested buoyancy control material lets to get the required density of extra heavy buoyancy control materials with a high accuracy within the range from 3500 to 3700 kg/m$^3$.

Use of ferro-manganese concentrate for both suggested buoyancy control materials is determined by two factors. First, ferro-manganese concentrate contains essential amount of oxide and hydroxide compounds of manganese, ferrum and other metals. Such compounds are good sulfur absorbents (absorbents for removal of sulphurated hydrogen from associated petroleum gas are made on their base). Sulfur is bound into complex compounds and consequently does not generate a negative impact on a reinforcing cage of a ballast layer and pipe body if the pipe has no insulating layer. Secondly, a high density of ferro-manganese concentrate enables to get extra heavy ballasting coating that in turn may lead to lowering the cost of the main pipe due to reduction of wall thickness.

BRIEF DESCRIPTION OF THE DRAWINGS

The invention is illustrated by the drawings where the following is shown.

DETAILED DESCRIPTION OF THE PREFERRED EMBODIMENT

Figure 1:
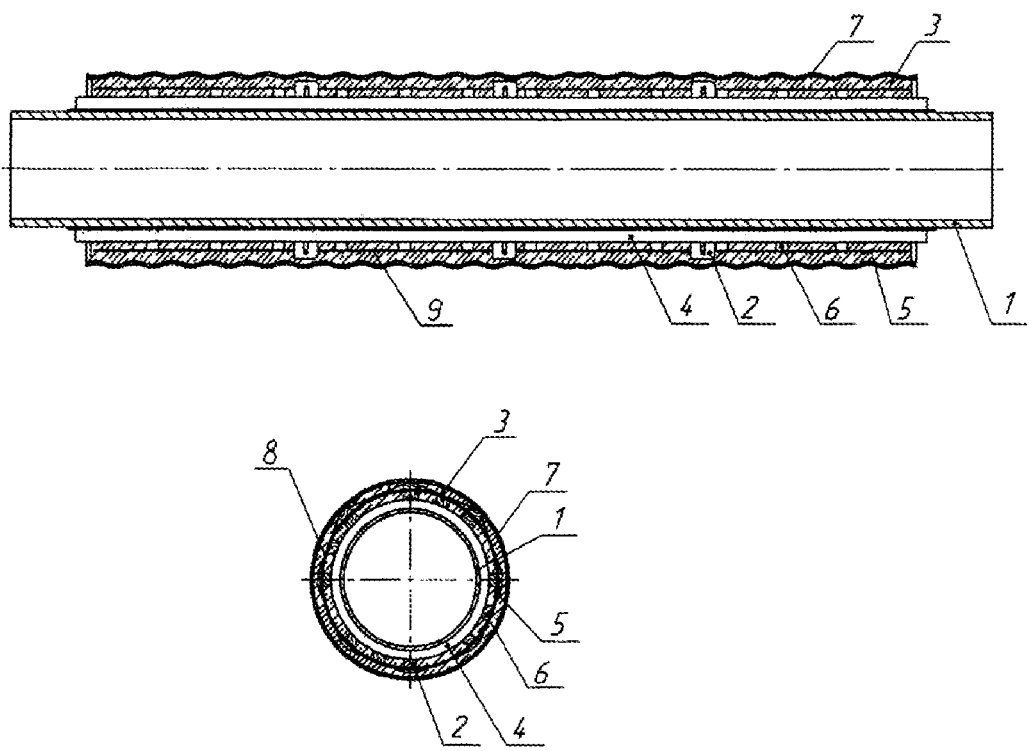
in FIG. 1—sectional views of a pipe having the ballasting coating made of a buoyancy control material with a polyurethane foam layer.

A pipe exemplary embodiment comprising a buoyancy control material coating for subsea main pipelines is presented in FIG. 1. The presented embodiment has a central pipe 1 and support-and-guide unit composed of centralizers 2. Therewith the central pipe 1 may be coated with a polyethylene protective layer (is not shown on figures). A polyurethane foam layer 4 is applied between the central pipe 1 and a buoyancy control material 3. Centralizers 2 are distributed and fixed on the polyurethane foam layer 4. A reinforcing cage 5 is fixed on the polyurethane foam layer 4 by pins 6 and located inside the buoyancy control material 3, the external surface of which is formed by a shell 7. The reinforcing cage 5 consists of a longitudinal reinforcement 8, on which a lateral reinforcement 9 is reeled in a spiral pattern with an equal pitch.

While manufacturing the central pipe 1, a three-layer polyethylene coating is applied on its surface and is removed from ends of the central pipe. Then central pipe 1 is coated with the polyurethane foam layer 4.

Polyurethane foam has a very low heat-conductivity factor—0.05 W/(m*K) that in case of the layer thickness equal to 80 mm gives a heat-transfer resistance amounted to 1.6 (m*K)/W. Polyurethane foam is very resistant to environmental exposure, it has not been destroyed when exposed to ultraviolet light, salts, acids up to 10% and alkalies.

The reinforcing cage 5 is mounted of the longitudinal reinforcement 8, on which the lateral reinforcement 9 is reeled in a spiral pattern with an equal pitch on a separate stand. The longitudinal and lateral reinforcements 8 and 9 are connected by a binding wire and/or welding. The mounted reinforcing cage 5 is fixed on the polyurethane foam layer 4 by means of pins 6. After that centralizers 2 are assembled. The shell 7 is formed above the reinforcing cage 5. The shell 7 may have different configurations, that is depending on a structure of centralizers 2 a cross section of the shell 7 may have a square, rectangle, circular or elliptic shape. The shell 7 may be made of different materials (metal, metal-polymer, polymer). A material of the shell 7 is selected subject to operation conditions of the pipe with a ballasting coating.

The buoyancy control material 3 for subsea main pipelines is injected in the space between the external surface of the polyurethane foam layer 4 and the shell 7 by a concrete pump.

Figure 2:
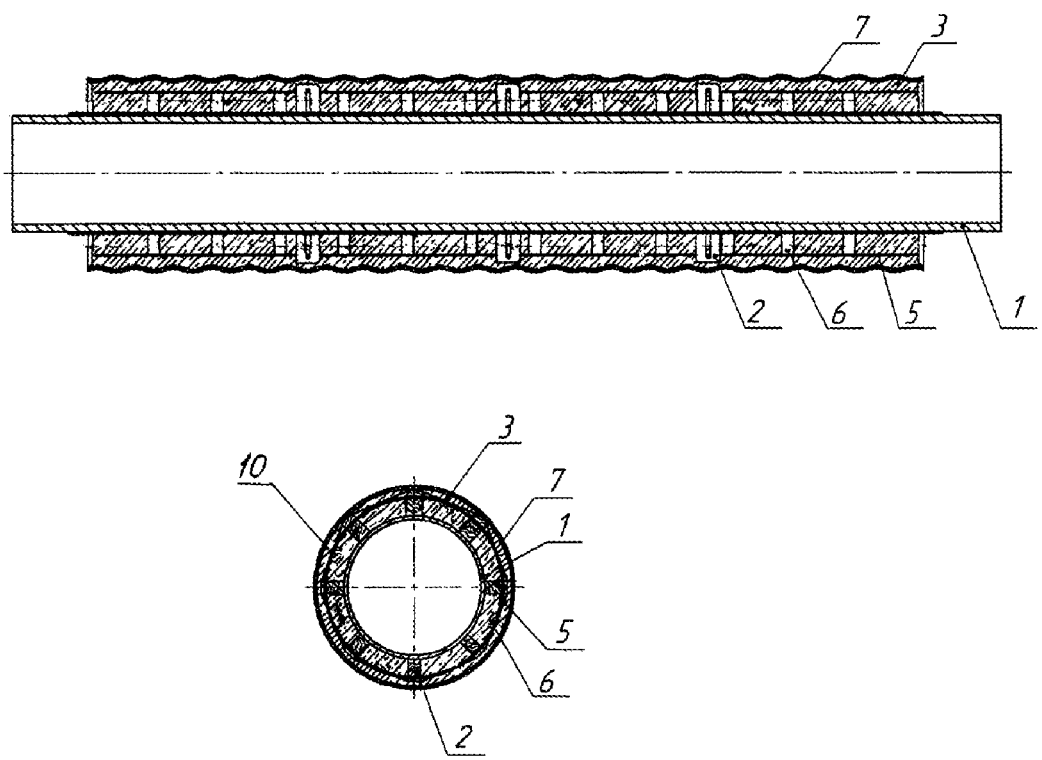
in FIG. 2—sectional views of a pipe having the ballasting coating made of a high-density buoyancy control material.

An exemplary embodiment of a pipe coated with a high-density buoyancy control material for subsea main pipelines is shown on FIG. 2. The given embodiment includes a central pipe 1 and support-and-guide unit consisting of centralizers 2. A mesh 10 is fixed by pins 6 and located inside of a buoyancy control material 3, the surface of that is formed by a shell 7.

While manufacturing the central pipe 1, a three-layer polyethylene coating is applied on its surface and is removed from ends of the central pipe.

Thereafter the mesh 10 is mounted and fixed on the central pipe 1 by pins 6, and centralizers 2 are assembled. The shell 7 is formed around the mesh 10 (metal, metal-polymer, polymer). The shell 7 may have different configurations, that is depending on a structure of centralizers 2, a cross section of the shell 7 may have a square, rectangle, circular or elliptic shape. A material of the shell 7 is selected subject to operation conditions of the pipe having a ballasting coating.

The high-density buoyancy control material 3 is injected in a space between the external surface of the central pipe 1 and shell 7.

A plasticizing agent is extremely important for extra heavy concretes. For the time being 4 basic types of plasticizing agents are employed: based on sulfonated naphthalene-formaldehyde polycondensates, based on sulfonated melamine—formaldehyde polycondensates, based on refined lignosulphates and based on polycarboxylates and polyacrylic resins. In spite of different type of effect on molecules, the essence of a plasticizing agent influence is confined to interaction of functional groups of a plasticizing agent with calcium hydroxide resulting in neutralization of molecules and their withdrawal from the surface of cement grains. However analysis of interaction mechanics of different plasticizing agents suggests that an efficiency of a plasticizing agent is based on polycarboxylates and polyacrylic resins is tentatively twice as much as an efficiency of plasticizing agents based on sulfonated naphthalene-formaldehyde polycondensates and based on sulfonated melamine—formaldehyde polycondensates and is almost thrice as much as an efficiency of plasticizing agents based on refined lignosulphates. Against this background a plasticizing agent in the form of the complex additive consisting of all types of plasticizing agents is employed in the given embodiment in the following ratios (vol. %): plasticizing agent based on polycarboxylates and polyacrylic resins from 72 to 82%, plasticizing agent based on sulfonated naphthalene-formaldehyde polycondensates from 4 to 10%, plasticizing agent based on sulfonated melamine—formaldehyde polycondensates from 6 to 10% and plasticizing agent based on refined lignosulphates from 3 to 8%.

Using a plasticizing agent in the form of the complex additive enables to achieve such mobility of the high-density buoyancy control material 3 which allows it to flow easily around such obstacles as centralizers 2 and pins 6. The buoyancy control material 3 has sufficient mobility to fill in all the space regardless a form of the shell cross section.

The buoyancy control material 3 solidifies within 3-3.5 hours. After that the construction has been left for 10-12 hours at +15 . . . +20° C. temperature to gain in strength of the buoyancy control material within the range from 3 to 5 MPa. The buoyancy control material has been gained in strength within the range from 3 to 20 MPa after laying the pipe having a ballasting coating on a sand cushion.

The claimed buoyancy control material for subsea main pipelines and high-density buoyancy control material for subsea main pipelines permits to manufacture pipes having a ballasting coating which are stronger, more heat-resistant and have an extended service life. Pipes with the claimed coating have a higher cross-breaking strength and may be used in installations of subsea pipelines to lay them in a variety of climatic conditions.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

TABLE 1

| Components | Composition No. 1 | Composition No. 2 | Composition by the original |
|---|---|---|---|
| Cement, kg/m$^3$ | 340 | 350 | 420 |
| Water, kg/m$^3$ | 150 | 150 | 140 |
| Polycarboxylate-ester-based plasticizing agent, kg/m$^3$ | 2.4 | 2.4 | — |
| Barite middling product, kg/m$^3$ | 960 | 700 | — |
| Gravel | — | — | 840 |
| Barite ore, kg/m$^3$ | 980 | 700 | 430 |
| Ferro-manganese concentrate, kg/m$^3$ | 950 | 1550 | — |
| Sand | — | — | 650 |
| Density, kg/m$^3$ | 3390 | 3450 | 2480 |
| Compression strength, MPa | 48 | 47 | 45 |

TABLE 2

| Component name | Density kg/cm$^3$ | Grain-size composition, mm |
|---|---|---|
| Barite middling product | from 3.78 to 3.82 | up to 5%; from 0.16 to 1.0 up to 25% from 1.0 to 2.5 up to 35% from 2.5 to 5.0 the rest |
| Barite ore | from 3.9 to 4.1 | up to 5%; from 0.16 to 1.0 up to 25% from 1.0 to 2.5 up to 35% from 2.5 to 5.0 the rest |
| Ferro-manganese concentrate | from 4.2 to 4.5 | up to 5%; from 0.16 to 1.0 up to 25% from 1.0 to 2.5 up to 35% from 2.5 to 5.0 the rest |

TABLE 3

| Components | Composition No. 1 | Composition No. 2 | Composition No. 3 | Composition by the original |
|---|---|---|---|---|
| Cement, kg/m$^3$ | 360 | 360 | 360 | 420 |
| Water, kg/m$^3$ | 150 | 150 | 150 | 140 |
| Plasticizing agent, kg/m$^3$ | 4 | 5 | 6 | — |
| Gravel | — | — | — | 840 |
| Barite ore, kg/m$^3$ | 550 | 350 | 120 | 430 |
| Ferro-manganese concentrate, kg/m$^3$ | 2490 | 2750 | 3080 | — |
| Sand | — | — | — | 650 |
| Density, kg/m$^3$ | 3500 | 3600 | 3700 | 2480 |
| Compression strength, MPa | 48 | 48 | 47 | 45 |

TABLE 4

| Component name | Density kg/cm$^3$ | Grain-size composition, mm. |
|---|---|---|
| Barite ore | from 3.9 to 4.1 | up to 3%; from 0.16 to 1.0 up to 27% from 1.0 to 2.5 up to 34% from 2.5 to 5.0 the rest |
| Ferro-manganese concentrate | from 4.2 to 4.5 | up to 3%; from 0.16 to 1.0 up to 27% from 1.0 to 2.5 up to 34% from 2.5 to 5.0 the rest |

The invention claimed is:

1. The buoyancy control material for subsea main pipelines, said material comprising:
    a sulfate-resisting portland cement,
    a filler including at least one of barite middling product, barite ore, and ferro-manganese concentrate,
    a polycarboxylate-ester-based plasticizing agent, and
    water, wherein
    a component ratio of entire buoyancy control material is as follows, % wt: said sulfate-resisting portland cement is from 8.2 to 10.5, water is from 5.2 to 6.7, and said polycarboxylate-ester-based plasticizing agent is from 0.1 to 0.15.

2. The buoyancy control material as set forth in claim 1, wherein at least one of said barite middling product, barite ore, and ferro-manganese concentrate as used includes the following ratios and ranges: said barite middling product ranges from 18% to 28% having a density from 3.78 to 3.82 kg/cm$^3$, said barite ore ranges from 18% to 28% having a density from 3.9 to 4.1 kg/cm³, and said ferro-manganese concentrate ranges from 25% to 45% having a density from 4.2 to 4.5 kg/cm³.

* * * * *